(12) United States Patent
Morrison et al.

(10) Patent No.: US 10,558,245 B2
(45) Date of Patent: Feb. 11, 2020

(54) INFORMATION HANDLING SYSTEM NARROW WIDTH HINGE

(71) Applicant: Dell Products L.P., Round Rock, TX (US)

(72) Inventors: John T. Morrison, Round Rock, TX (US); Anthony J. Sanchez, Pflugerville, TX (US); David J. Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/887,010

(22) Filed: Feb. 2, 2018

(65) Prior Publication Data

US 2019/0243426 A1 Aug. 8, 2019

(51) Int. Cl.
*G06F 1/16* (2006.01)
*E05D 3/12* (2006.01)
*E05D 11/00* (2006.01)

(52) U.S. Cl.
CPC .......... *G06F 1/1681* (2013.01); *E05D 3/122* (2013.01); *E05D 11/0054* (2013.01); *G06F 1/1637* (2013.01); *E05D 2011/0072* (2013.01); *E05Y 2201/604* (2013.01); *E05Y 2900/606* (2013.01); *G06F 1/1615* (2013.01)

(58) Field of Classification Search
CPC .... G06F 1/1681; G06F 1/1637; G06F 1/1615; E05D 11/0054; E05D 3/122; E05D 2011/0072; E05Y 2900/606; E05Y 2201/604
See application file for complete search history.

(56) References Cited

U.S. PATENT DOCUMENTS

| 6,983,514 | B2* | 1/2006 | Lu | G06F 1/1616 16/303 |
| 7,581,290 | B2* | 9/2009 | Chang | G06F 1/1616 16/303 |
| 7,832,056 | B2* | 11/2010 | Kuwajima | H04M 1/022 16/282 |
| 8,402,608 | B2* | 3/2013 | Lee | G06F 1/1681 16/319 |
| 8,474,101 | B2* | 7/2013 | Wang | G06F 1/1681 16/354 |
| 2002/0038493 | A1* | 4/2002 | Ko | H04N 5/2251 16/303 |
| 2005/0050686 | A1* | 3/2005 | Kurokawa | G06F 1/1618 16/354 |
| 2005/0155183 | A1* | 7/2005 | Lu | A47K 3/38 16/340 |

(Continued)

*Primary Examiner* — Jinhee J Lee
*Assistant Examiner* — Theron S Milliser
(74) *Attorney, Agent, or Firm* — Zagorin Cave LLP; Robert W. Holland

(57) ABSTRACT

An information handling system narrow width dual axes hinge rotationally couples portable information handling system housing portions to each other with minimal spacing between the housing portions. A gear assembly synchronizes motion about the dual axles at one end of the dual axles, the gear assembly having brackets to couple to each housing portion. Torque brackets couple to the opposite end of the dual axles, each torque bracket couple to a housing portion and resisting rotation of the housing portions by generating friction at the axle.

14 Claims, 4 Drawing Sheets

(56) References Cited

U.S. PATENT DOCUMENTS

| | | | |
|---|---|---|---|
| 2007/0226955 A1* | 10/2007 | Cho | E05D 3/122 16/354 |
| 2008/0242359 A1* | 10/2008 | Seol | G06F 1/1616 455/566 |
| 2009/0013500 A1* | 1/2009 | Ueyama | G06F 1/1616 16/354 |
| 2009/0070961 A1* | 3/2009 | Chung | E05D 3/122 16/354 |
| 2011/0271486 A1* | 11/2011 | Wang | G06F 1/1681 16/319 |
| 2011/0289728 A1* | 12/2011 | Wang | E05D 3/122 16/337 |
| 2012/0096678 A1* | 4/2012 | Zhang | G06F 1/1681 16/302 |
| 2013/0111704 A1* | 5/2013 | Mitsui | H04M 1/022 16/250 |
| 2013/0139355 A1* | 6/2013 | Lee | H04M 1/022 16/354 |
| 2013/0322004 A1* | 12/2013 | Park | F16C 11/10 361/679.27 |
| 2014/0360296 A1* | 12/2014 | Hsu | G06F 1/1616 74/98 |
| 2016/0070310 A1* | 3/2016 | Holung | G06F 1/1681 361/679.09 |
| 2016/0378145 A1* | 12/2016 | Sung | G06F 1/1632 361/679.55 |

\* cited by examiner

INFORMATION HANDLING SYSTEM NARROW WIDTH HINGE

BACKGROUND OF THE INVENTION

Field of the Invention

The present invention relates in general to the field of portable information handling systems, and more particularly to an information handling system narrow width hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have a variety of configurations and capabilities. Typically, portable information handling system size is defined by the size of the display integrated in the portable housing. As an example, tablet information handling systems have a single planar display integrated on one face of a planar housing. Smaller displays have smaller housings with increased portability, such as with mobile telephone housings. Increasing tablet display sizes tend to provide larger viewing areas at the expense of portability. Larger housing sizes also tend to support more powerful processing components that provide more powerful processing capabilities. Tablet information handling systems rely upon a touchscreen integrated with the display as the primary input device. More complex portable information handling systems tend to integrate a keyboard into the housing to support end user inputs. In many instances, the keyboard and display couple into separate housing portions that are rotationally coupled together by a hinge. Rotationally coupling the keyboard to the display allows the information handling system to rotate to an open position for accepting keyed inputs and rotate to a closed position for improved portability. Typical configurations include a clamshell configuration that rotates 90 degrees to an open position having the keyboard disposed below the display and a convertible configuration that rotates 360 degrees to expose the display similar to a tablet.

In order to enhance portability, information handling system manufacturers typically attempt to limit the height of the housing, sometimes referred to as the Z axis height. One recent innovation that has helped restrict system height is the use of organic light emitting diode (OLED) displays. OLED displays present visual images without a backlight so that the height of the display is, effectively, a thin film having OLED material and integrated wirelines that drive OLED pixels to generate defined colors. Recently, portable information handling systems have included rotationally coupled housing portions that have OLED displays on the upper surface of both housing portions. The result is two displays that open like a book and provide the user with flexibility to use both displays for consuming content or have one display configured as an input device, such as with a virtual keyboard. One goal of such a system is to have the displays in close proximity to each other so that information presented on the displays is easy for an end user to consume. One difficulty with placing the displays in close proximity is that a hinge typically has to fit between the housing portions that hold the displays. Synchronized hinges typically have gears that interconnect parallel axles and a friction device that provides torque to manage hinge rotation. Robust hinge assemblies tend to have distance between the two axles that translates to distance between the two displays of the two housing portions.

SUMMARY OF THE INVENTION

Therefore, a need has arisen for a system and method which provides a narrow width hinge to rotationally couple information handling system housings in close proximity to each other.

In accordance with the present invention, a system and method are provided which substantially reduce the disadvantages and problems associated with previous methods and systems that rotationally couple information handling system housing portions to each other. A dual axis hinge synchronizes housing portion rotation with a gear assembly that couples to each housing portion. Torque to manage housing rotation is generated from torque brackets coupled to each axle and each housing portion that rotate independent of the gear assembly.

More specifically, a portable information handling system has first and second housing portions rotationally coupled to each other by first and second hinge assemblies. The housing portions contain processing components that cooperate to generate information, such as a central processing unit (CPU) and memory that execute instructions and generate visual information for presentation at a display. A display integrated in the upper surface of each housing portion presents the visual information as visual images. Each hinge assembly includes narrow width dual axles that maintain the displays in close proximity for a uniform appearance that minimizes disruption of viewing of the visual information. Each hinge assembly includes a gear assembly that synchronizes housing portion rotational movement by translating rotational movement of the housing portions between each other through interlocking gears disposed on the dual axels proximate the perimeter of the housing. The gear assembly includes a bracket for each axle that couples the housing portions to the hinge assembly. To manage rotational motion and positioning of the housing portions, a torque bracket couples to each axle end opposite the gear assembly and couples to each housing portion. Each torque bracket resists rotation about its axle to generate torque independent of the gear assembly.

The present invention provides a number of important technical advantages. One example of an important technical advantage is that information handling system housing portions rotationally couple in close proximity to each other so that displays integrated in the housing portions present visual information with minimal spacing between the displays. Separating a synchronized hinge assembly from a torque mechanism lets width between the axles be driven by gear size independent of torque needs. The torque mechanism shifts away from the gear mechanism to reduce cap size at the gear mechanism, providing a cleaner and more eloquent system appearance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A narrow width hinge assembly rotationally couples information handling system housing portions in close proximity to each other. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
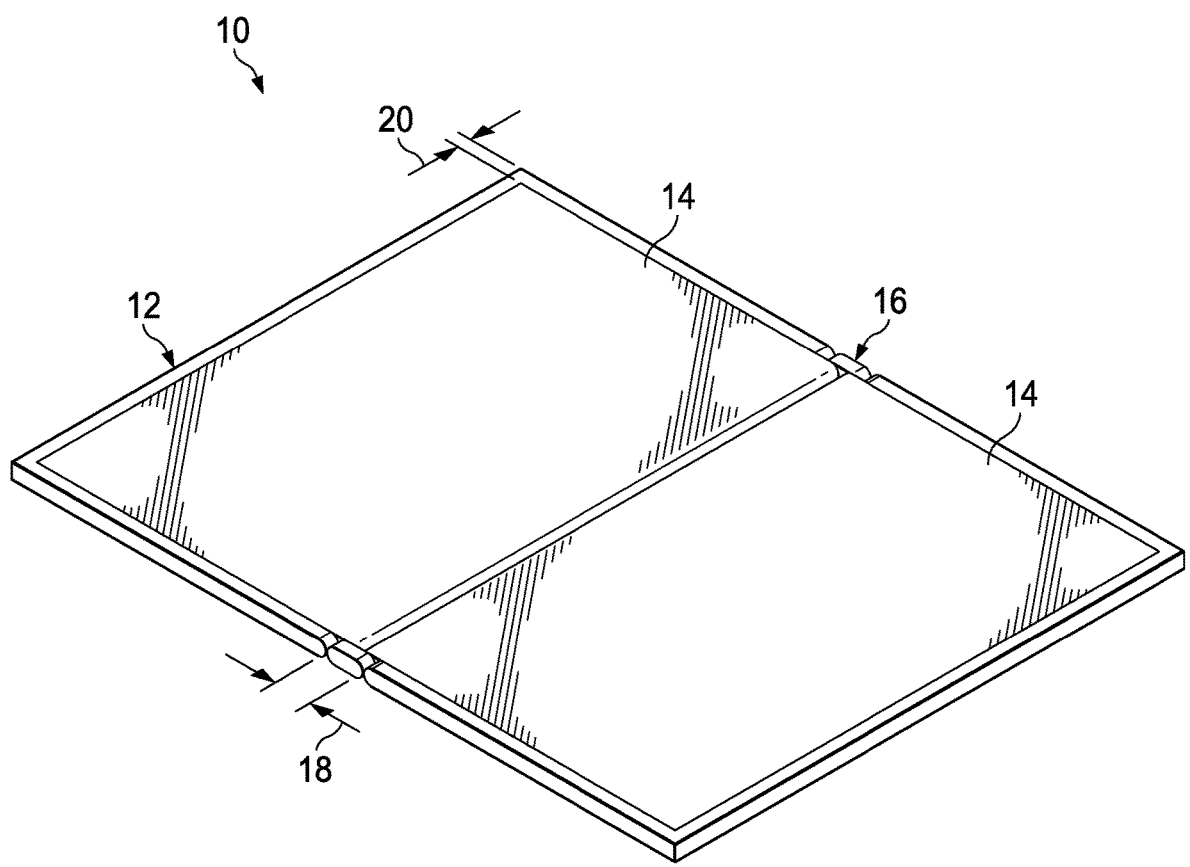
FIG. 1 depicts an isometric view of a portable information handling system having rotationally coupled housing portions.

Referring now to FIG. 1, an isometric view depicts a portable information handling system 10 having rotationally coupled housing portions 12. In the example embodiment, portable information handling system 10 has first and second displays 14 with each display 14 disposed at an upper surface of each housing portion 12. To enhance an end user's experience viewing displays 14, housing portions couple in close proximity to each other using first and second dual axis synchronized hinge elements visible to the end user only as hinge caps 16 disposed on opposing ends of a rotational axis defined between displays 14 by the hinge elements. The narrow width of the hinge elements provides a narrow gap 18 between displays 14 so that visual information presented on displays 14 has a more uniform appearance than would be presented with larger gaps. In addition, a minimal size of hinge cap 16 supports a narrow bezel 20 defined between the outer perimeter of displays 14 and the outer perimeter of housing portions 12. In the example embodiment, the hinge gap 18 between displays 14 has a size of approximately 12 mm and the bezel gap 20 has a size of approximately 6 mm. In the example embodiment, housing portions 12 rotate 360 degrees relative to each other between a closed position having the displays 14 pressed against each other and a tablet position having a display 14 exposed at each face of portable information handling system 10. In alternative embodiments, hinge gap 18 spacing may vary based upon the amount of rotational movement supported between housing portions 12.

Figure 2:
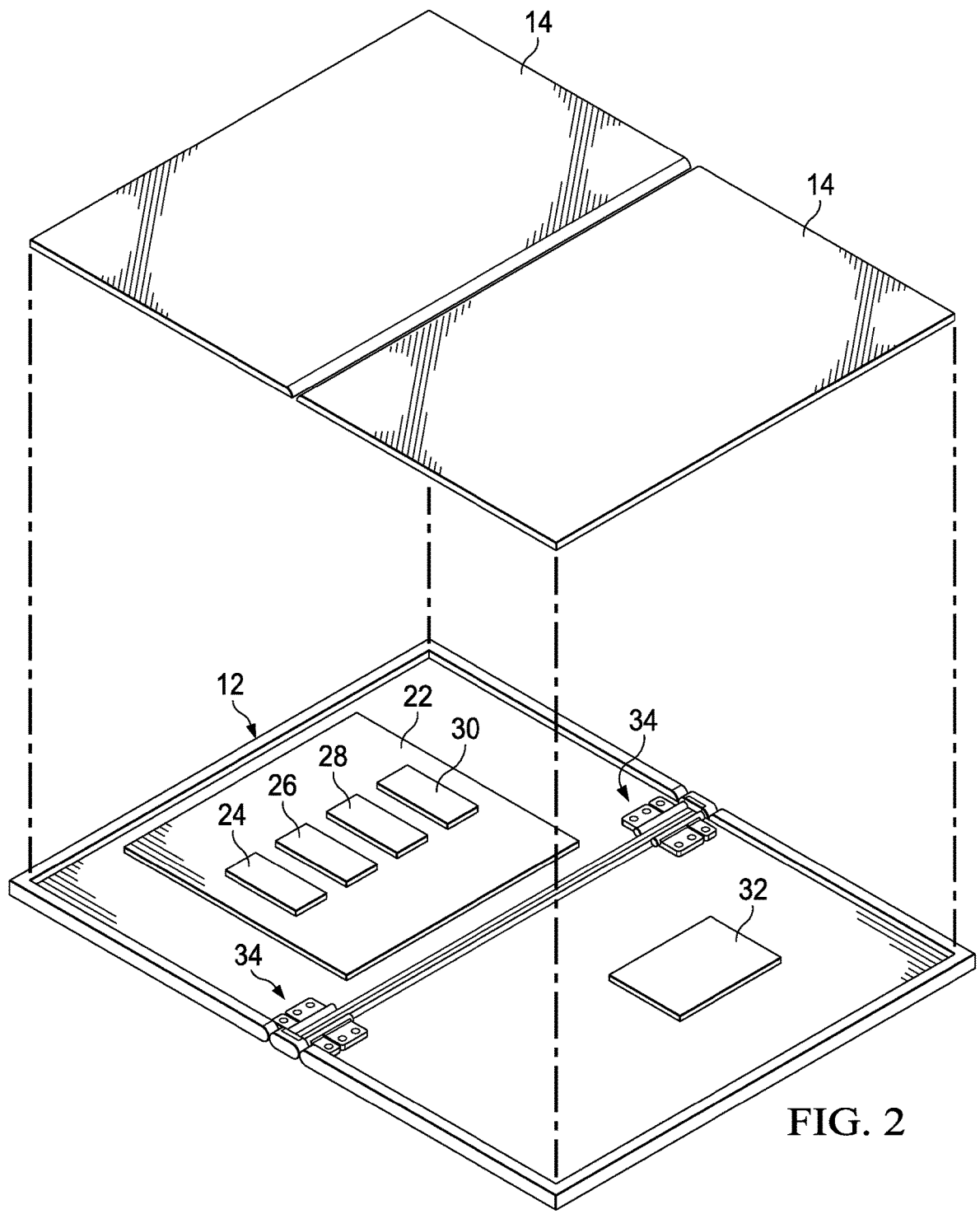
FIG. 2 depicts an isometric view of the portable information handling system having the displays removed to show first and second hinge assemblies.

Referring now to FIG. 2, an isometric view depicts portable information handling system 10 having the displays 14 removed to show first and second hinge assemblies 34 that rotationally couple housing portions 12 together. In the example embodiment, a motherboard 22 integrated in one housing portion 12 interfaces processing components that cooperate to process information. A central processing unit (CPU) 24 executes instructions to process information in cooperation with a random access memory (RAM) 26, such as by executing applications over an operating system. A chipset 28 manages interactions between CPU 24 and physical devices, such as inputs made as touches to a display 14 and a graphical processor unit (GPU) 30 that generates pixel values from the information for presentation as visual images at displays 14. A solid state drive (SSD) 32 or other persistent storage device stores information and applications during power down of the system. Alternative embodiments may include other processing components, such as wireless network interface cards, and have alternative configurations of the components within housing portions 12. In one example embodiment, displays 14 are OLED displays so that the Z height of housing portions 12 is kept to a minimal height.

In the example embodiment, hinge assemblies 34 rotate housing portions 360 degrees relative to each other with a dual axis synchronized gear assembly. Dual axis motion supported by hinge assembly 34 adjusts the relative vertical positions of housing portions 12 to support closed and tablet configurations of housing portions 12. The distance between the dual axes is driven by the Z height of housing portions 12 so that the low Z height of the example embodiment supports minimal distance between hinge assembly axles difficult to achieve with conventional dual axis hinge assemblies.

Figure 3:
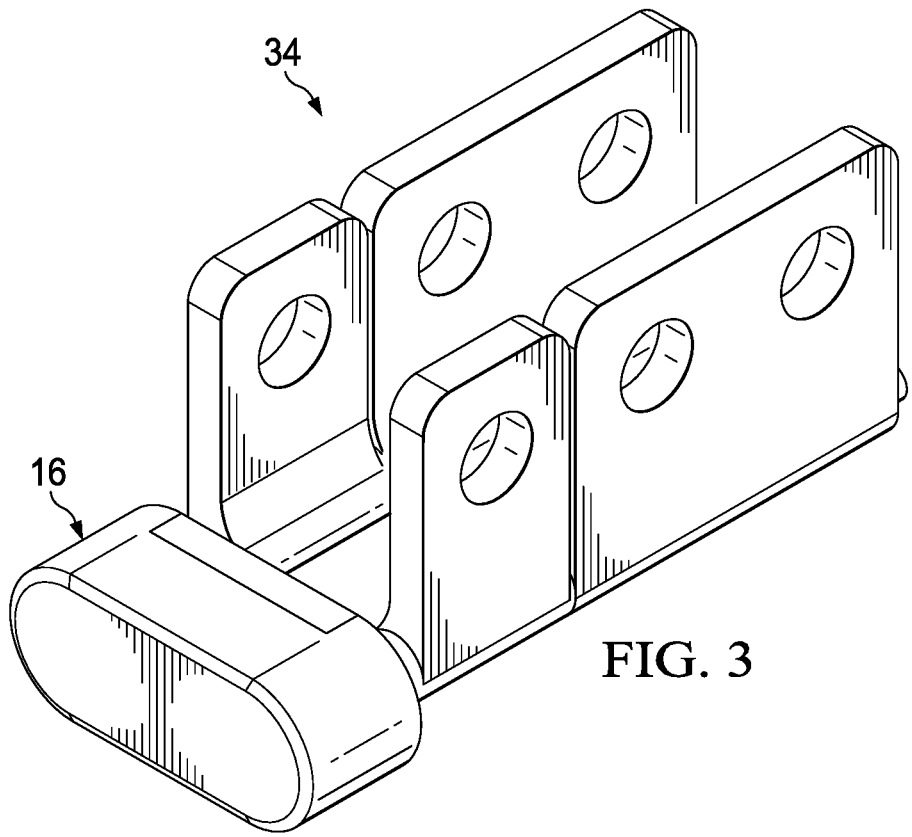
FIG. 3 depicts an isometric perspective view of a hinge assembly having separate gear and torque brackets.

Referring now to FIG. 3, an isometric perspective view depicts a hinge assembly 34 having separate gear 40 and torque 38 brackets. Hinge cap 16 couples to hinge assembly 34 to cover a gear assembly that synchronizes motion of gear brackets 40, as described in greater depth below. As is presented in FIG. 2, hinge cap 16 has a minimal size that supports a narrow display bezel around the outer perimeter of housing portions 12. The minimal size of hinge cap 16 is provided by a separation of synchronization and torque generation at hinge assembly 34.

Figure 4:
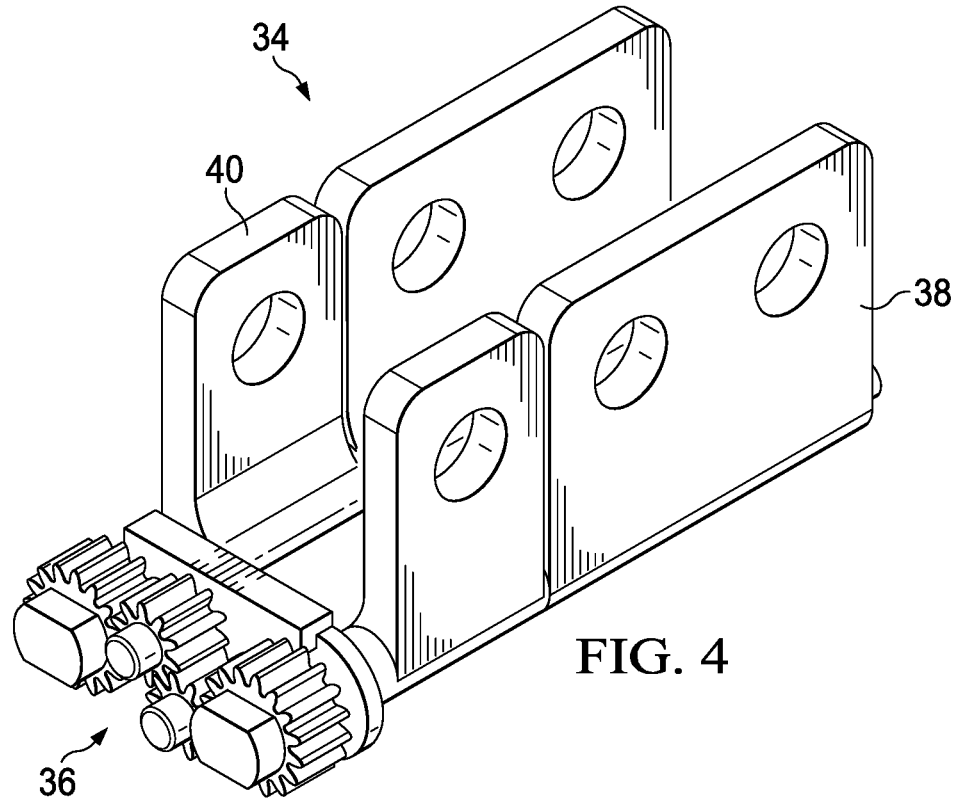
FIG. 4 depicts an isometric perspective view of the hinge assembly with an end cap removed to expose the gear assembly.

Referring now to FIG. 4, an isometric perspective view depicts hinge assembly 34 with an end cap 16 removed to expose a gear assembly 36 that synchronizes motion of gear brackets 40. Hinge assembly 34 drives the critical stack, meaning the width between the dual axes, to be defined by gear assembly 36 by separating out torque generation away from gear assembly 36. In the example embodiment, gear assembly 36 inserts onto the dual hinge axes at hinge cap 16 proximate the outer perimeter of housing portions 12. Torque brackets 38 insert onto the dual hinge axes opposite gear assembly 36 and are decoupled from gear assembly 36, meaning that no fixed relationship exists between gear assembly 36 and torque brackets 38 while hinge assembly 34 is separate from housings 12. For instance, each torque bracket 38 moves independently relative to each other and gear assembly 36. Each torque bracket 38 generates torque through a frictional relationship with the hinge assembly axis on which each torque bracket 38 is inserted. In contrast, rotational movement of a gear bracket 40 translates through gear assembly 36 to the other gear bracket 40 so that gear brackets 40 rotate in a synchronized manner. As depicted in FIG. 4, without an attachment to housing portions 12, gear assembly 36 rotates without application of torque by torque brackets 38 because no direct physical coupling exists between gear assembly 36 and torque bracket 38. Decoupling of the torque mechanism to each separate hinge axis as away from the synchronization mechanism reduces the size of hinge cap 16, which covers gear assembly 36, relative to hinge assemblies that integrate torque generation with a synchronization mechanism.

Torque that manages rotational movement and positioning of gear assembly 36 is created by torque brackets 38 and translated to housing portions coupled to torque bracket 38. Gear brackets 40 couple to the housing portions 12 proximate torque brackets 38 so that rotation of a housing portion experiences torque generated by rotation of a torque bracket 38, which is in turn translated through gear assembly 36. However, the generation of torque by torque brackets 38 result from rotation of torque brackets 38 and this torque is not directly translated to gear assembly 36 through hinge assembly 34. The absence of direct coupling through hinge assembly 34 of torque brackets 38 and gear assembly 36 allows for a reduced size of hinge assembly 36 that supports a narrow axis width of hinge assembly 34.

Figure 5:
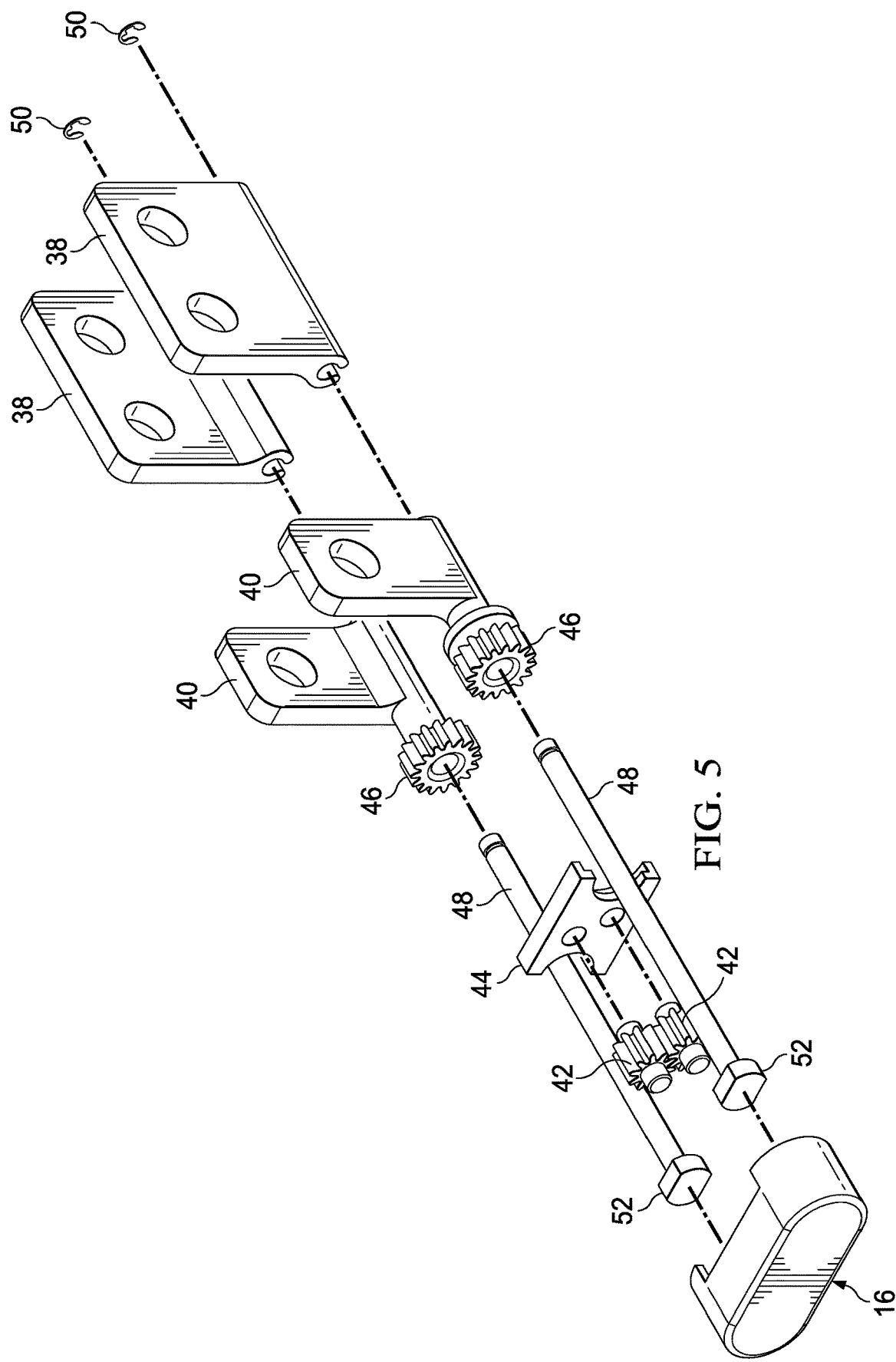
FIG. 5 depicts an exploded view of the hinge assembly.

Referring now to FIG. 5, an exploded view depicts hinge assembly 34. In the example embodiment, gear assembly 36 includes a set of gear brackets 40 that have rotational movement translated between each other with an idler gear assembly having idler gears 42 coupled to an idler bracket 44. Hinge assembly 34's rotational axes are defined by a pair of parallel axles 48 having a press fit shaft end 52 formed to couple with hinge cap 16. Each gear bracket 40 slides onto an axle 48 so that a gear 46 abuts against shaft end 52. Gear bracket 40 is formed in any conventional manner to have gear 46 affixed relative to gear bracket 40 and inserted around an axle 48. Gear brackets 40 are maintained in a spaced relationship by an idler bracket 44 inserted between gear brackets 40 behind gears 46. Idler bracket 44 has two openings that each accept an idler gear 42. When assembled as gear assembly 36, rotation of a gear bracket 40 at a first axle 48 translates to the gear bracket 40 on the other shaft 48 through the interlocking relationship of gears 46 and idler gears 42. An opening formed in each gear bracket 40 accepts a coupling device, such as a screw, that couples the gear bracket 40 to a housing portion 12. When each gear bracket 40 couples to a housing portion 12, the housing portions 12 have synchronized rotational movement driven through gears 46 and idler gears 42.

In the example embodiment, torque brackets 38 include openings that accept a coupling device, such as a screw, that couples each torque bracket 38 to a housing portion 12. A torque bracket 38 inserts onto each axle 48 to abut against a gear bracket 40 without any direct coupling to the gear bracket 40. A retainer clip 50 couples onto the end of each axle 48 to secure torque bracket 38 in place. In the example embodiment, each axle 48 has a length that, when gear assembly 36 and torque bracket 40 are inserted over the axle 48, provides a secure assembly of the hinge with minimal lateral movement along the hinge axis 48. In alternative embodiments, alternative coupling arrangements may keep the hinge assembly together as a contiguous assembly. For example hinge cap 16 may couple with and maintain the parallel relationship of axles 48 with alternative mechanical mechanisms. Similarly, retention clips 50 that couple to axles 48 with a c-clip arrangement may be replaced with alternative mechanisms that keep torque brackets 38 and gear brackets 40 on axles 48.

In operation, torque brackets 38 generate torque with friction created by rotation of torque bracket 38 relative to axle 48. The amount of torque generated may be defined by adjusting how tightly torque bracket 38 inserts around axle 48 and the type of material interface at the intersection of torque bracket 38 and axle 48, such as that defines the coefficient of friction of torque bracket 38 relative to axle 48. For example, the length of torque bracket 38 and the associated surface area of contact along axle 48 may be adjusted in various embodiments to create a desired torque response. Each torque bracket 38 rotates about its associated axle 48 independently of the other torque bracket and the gear assembly 36. Decoupling generation of torque from gear assembly 36 reduces stress at the interlocking gears 42 and 46 so that gear assembly 36 withstands increased numbers of rotational cycles. Transfer of torque from torque brackets 38 to gear assembly 36 is performed indirectly by coupling of each torque bracket 38 to a housing portion 12 next to a gear bracket 40 at the housing portion 12. This arrangement supports some fluctuation about axles 48 that help absorb torsional forces introduced during housing portion rotation.

Although the present invention has been described in detail, it should be understood that various changes, substitutions and alterations can be made hereto without departing from the spirit and scope of the invention as defined by the appended claims.

What is claimed is:

1. An information handling system comprising:
first and second housing portions, at least one of the housing portions having processing components cooperating to generate information;
first and second displays integrated in the first and second housing portions, the first and second displays interfaced with the processing components to present the information as visual images; and
a hinge assembly rotationally coupling the first and second housing portions to each other to rotate in a first direction from a closed position to an open position and in a second direction from an open position to a closed position, the hinge assembly having first and second parallel axles, a gear assembly coupled to the first and second parallel axles to synchronously rotate the first and second housing portions, the gear assembly integrating a first gear and first bracket in a first single part to fixedly couple to the first housing portion and to the first axle, the gear assembly further integrating a second gear and second bracket in a second single part to fixedly couple to the second housing portion and to the second axle, the gear assembly synchronizing movement by the first and second brackets with interconnected gears, the hinge assembly further having first and second torque brackets, the first torque bracket rotationally coupled to the first axle and fixedly coupled to the first housing portion, the second torque bracket rotationally coupled to the second axle and fixedly coupled to the second housing portion, the first and second torque brackets rotating about the first and second axles independent of the gear assembly to provide torque that resists rotation of the housing portions in both the first and second directions.

2. The system of claim 1 further comprising:
a press fit coupler formed on one end of each axle; and
an end cap sized to fit over the press fit couplers.

3. The system of claim 1 wherein the gear assembly further comprises:
a spacer coupled between the first and second axles and having first and second openings;
first and second idler gears, the first idler gear coupled to the first spacer opening, the second idler gear coupled to the second spacer opening;
first and second bracket gears, the first bracket gear coupled to the first bracket and inserted over the first axle, the second bracket gear coupled to the second bracket and inserted over the second axle; and
wherein rotation of the first bracket gear translates to the second bracket gear through the idler gears.

4. The system of claim 3 wherein the first torque bracket inserts over the first axle and the second torque bracket inserts over the second axle.

5. A hinge comprising:
first and second axles;
a first gear inserted over the first axle to rotate with the first axle and having a first bracket integrated as a single part with the first gear, the first bracket to couple to a first housing;
a second gear inserted over the second axle to rotate with the second axle and having a second bracket integrated as a single part with the second gear, the second bracket to couple to a second housing, the first and second gears translating rotation between each other to rotate the first and second housings synchronously in first and second opposing directions;
a first torque bracket inserted over the first axle separate from the first gear and configured to fixedly couple to the first housing, the first torque bracket engaging the first axle to resist rotation relative to the first axle in both the first and second opposing directions; and
a second torque bracket inserted over the second axle separate from the second gear and configured to fixedly couple to the second housing, the second torque bracket engaging the second axle to resist rotation relative to the second axle in both the first and second opposing directions.

6. The hinge of claim 5 further comprising:
a first retention clip coupled at an end of the first axle to retain the first torque bracket on the first axle; and
a second retention clip coupled at an end of the second axle to retain the second torque bracket on the second axle.

7. The hinge of claim 5 further comprising:
an idler spacer disposed between the first and second axles proximate the first and second gears;
first and second idler gears coupled to the idler spacer and interconnecting with each other; and
wherein the first and second gears translate motion between each other through the first and second idler gears.

8. The hinge of claim 5 wherein resistance against rotation at the first and second torque brackets manages torque of the first and second housing rotated relative to each other about the first and second axles.

9. A method for rotationally coupling information handling system housings together, the method comprising:
coupling a first geared bracket to a first housing, the gear and bracket integrated as a single part;
coupling a second geared bracket to a second housing, the gear and bracket integrated as a single part;
rotating the first geared bracket about a first axle in first and second directions;
translating the rotating to the second geared bracket to rotate about a second axle, the translating through interfacing of the first and second geared brackets to synchronously rotate the first and second housings;
coupling a first torque bracket to the first housing in a fixed manner and coupling the first torque bracket to the first axle in a rotational manner; and
resisting the rotating with friction generated by rotation of the first housing about the first axle at the first torque bracket in both the first and second directions.

10. The method of claim 9 further comprising:
coupling a second torque bracket to the second housing and the second axle; and
resisting the rotating with friction generated by rotation of the second housing about the second axle at the second torque bracket.

11. The method of claim 10 wherein:
the first and second geared brackets couple at a first end of the first and second axles; and
the first and second torque brackets couple at an opposite end of the first and second axles.

12. The method of claim 11 wherein the first and second geared brackets rotate on the first and second axles independently of the first and second torque brackets.

13. The method of claim 11 further comprising:
forming a press fit coupler at the first end of the first and second axles; and
fitting an end cap over the press fit coupler.

14. The method of claim 11 further comprising:
disposing an idler bracket between the first and second axles;
coupling idler gear to the idler bracket; and
translating rotation between the first geared bracket and the second geared bracket through the idler gear.

* * * * *